United States Patent [19]

Markum

[11] 4,313,397
[45] Feb. 2, 1982

[54] APPARATUS FOR MOTIVATING ANIMALS TO MOVE

[76] Inventor: Donnie D. Markum, 810 Adobe, Amarillo, Tex. 79111

[21] Appl. No.: 114,265

[22] Filed: Jan. 22, 1980

[51] Int. Cl.³ .................. A01K 15/00; A01K 29/00; B61B 3/00
[52] U.S. Cl. ................................ 119/29; 119/51 R; 104/89
[58] Field of Search .............. 119/14.03, 22, 29, 51 R, 119/51.11; 104/1 B, 89, 93

[56] References Cited

U.S. PATENT DOCUMENTS

| | | | |
|---|---|---|---|
| 1,467,507 | 9/1923 | Schwengel | 119/22 X |
| 2,823,409 | 2/1958 | Allred | 104/93 X |
| 3,124,104 | 3/1964 | Carpenter | 119/51.12 |
| 3,550,812 | 12/1970 | Brown | 119/51.11 X |
| 3,572,251 | 3/1971 | Johnson | 104/89 |
| 3,681,542 | 8/1972 | Johnson | 104/89 X |
| 3,805,741 | 4/1974 | Thompson et al. | 119/20 |
| 4,006,714 | 2/1977 | Goossen | 119/20 |
| 4,167,153 | 9/1979 | Markum | 119/51 R |

FOREIGN PATENT DOCUMENTS 475135 9/1975 U.S.S.R. ................ 119/29

OTHER PUBLICATIONS

"Cyclone 'track'n carry'" description from Cyclone Catalog, p. P16.

Primary Examiner—Gene Mancene
Assistant Examiner—Robert P. Swiatek
Attorney, Agent, or Firm—E. Harrison Gilbert, III

[57] ABSTRACT

An apparatus for motivating one or more animals to move within an enclosed area is disclosed. The apparatus includes a track disposed within the enclosed area and a carriage movably mounted on the track. Also included are a drive mechanism for moving the carriage around the track and an actuating element for actuating the drive mechanism. The invention also includes one or more of a number of elements which are perceivable by the animal and which cause the animal to move within the enclosed area. The actuating element includes a docking member which is connected adjacent the track and a switch which interacts with the docking member to control the movement of the carriage along the track. The actuating member further includes a temperature sensing element which causes the carriage to move along the track whenever a temperature is sensed which is outside a predetermined range.

22 Claims, 9 Drawing Figures

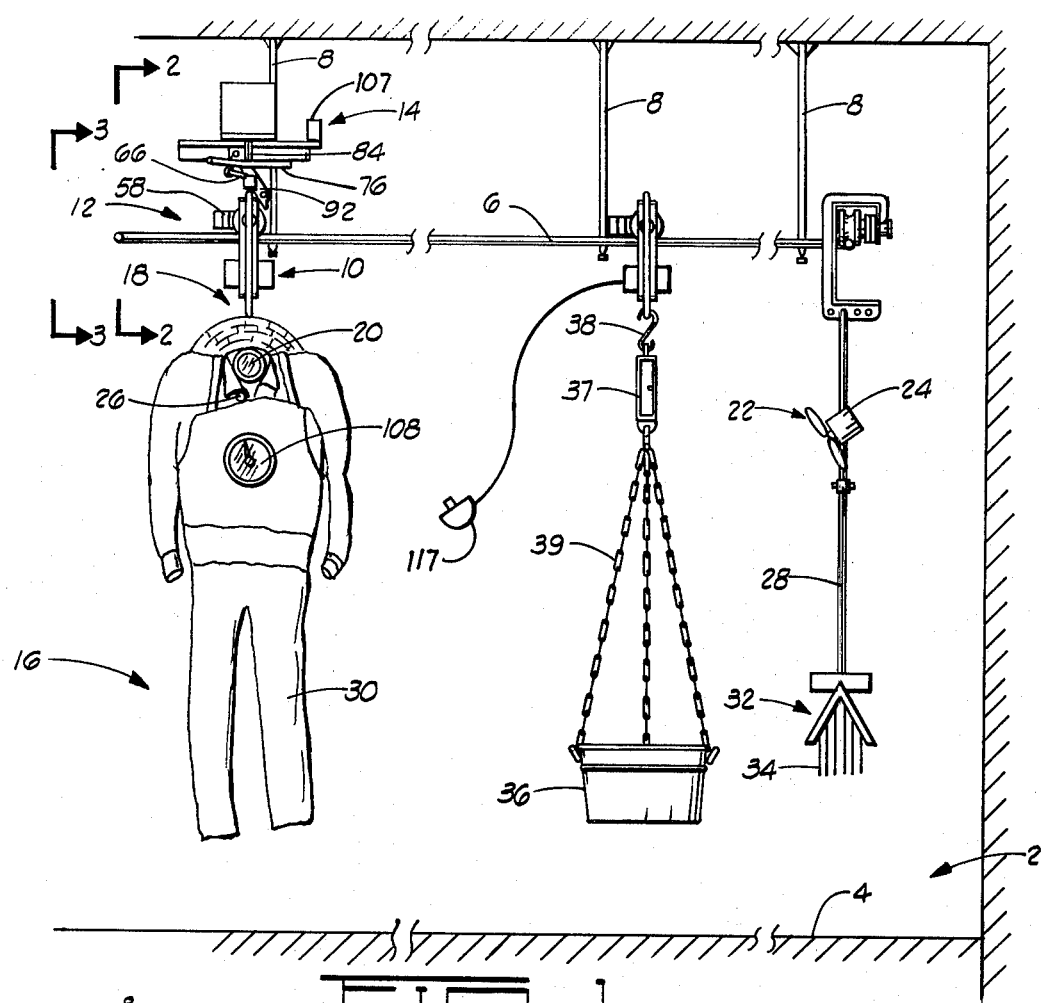
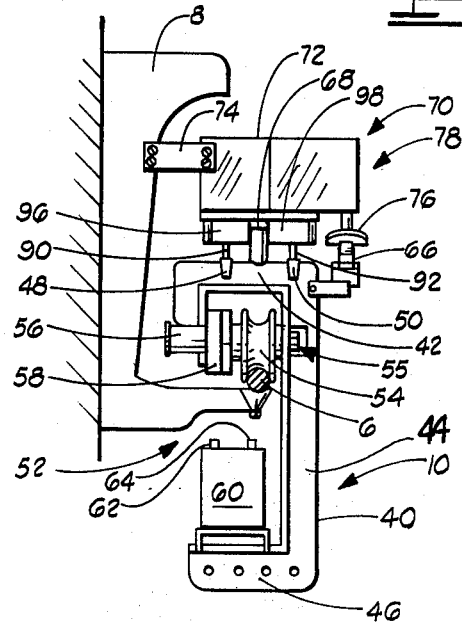
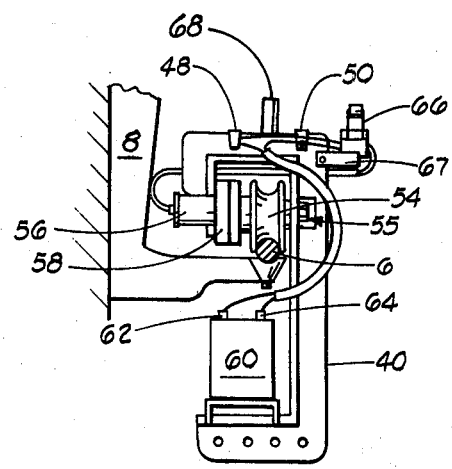

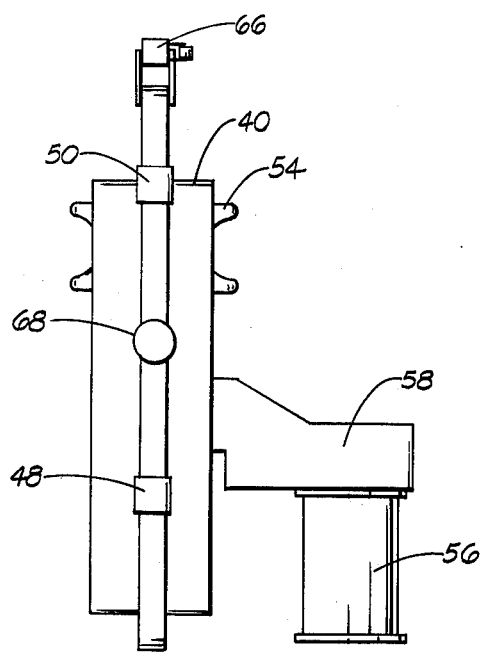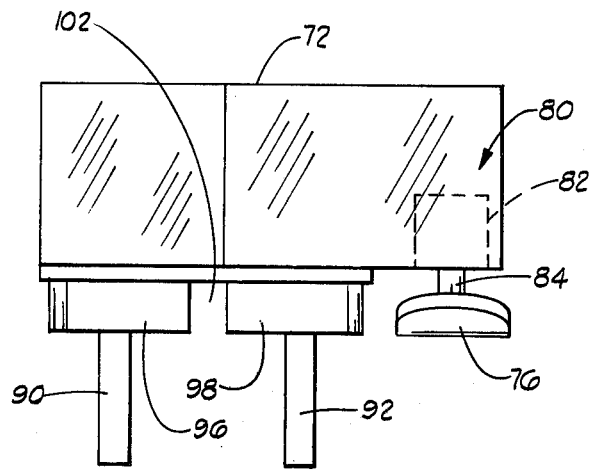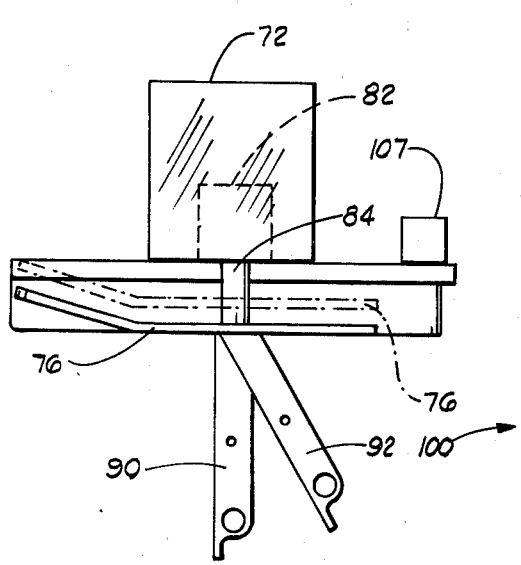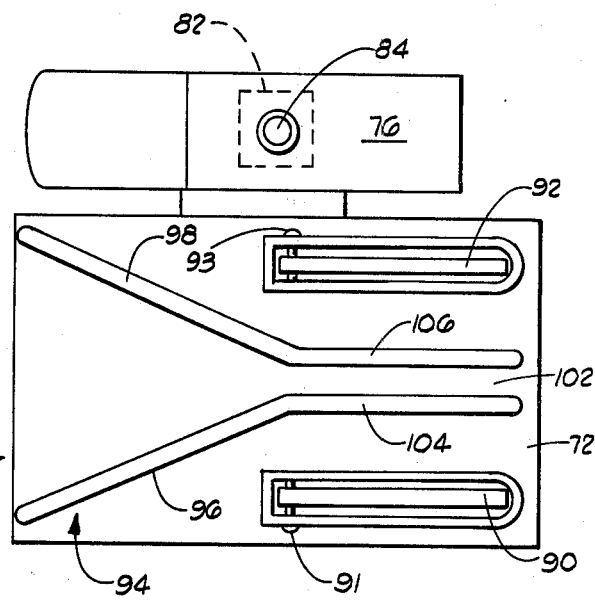
FIG. 4
FIG. 5
FIG. 6
FIG. 7

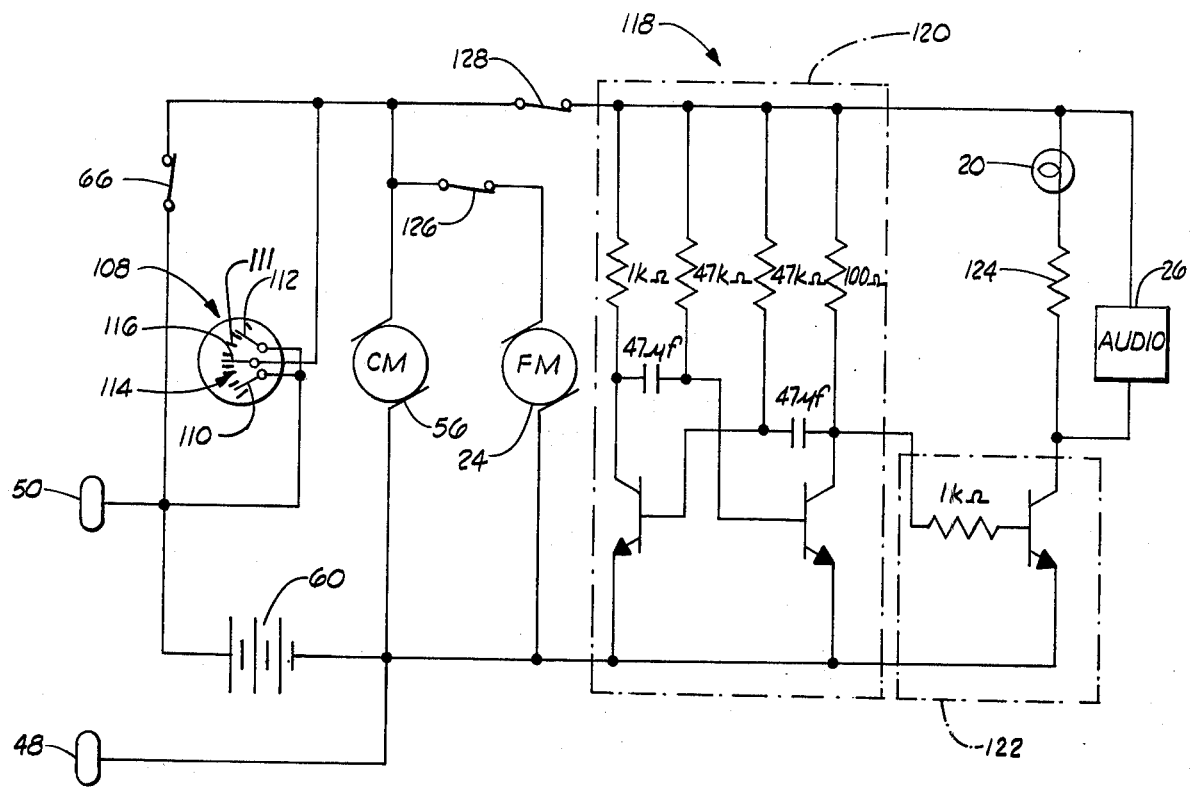
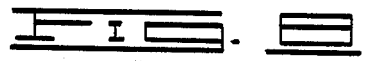
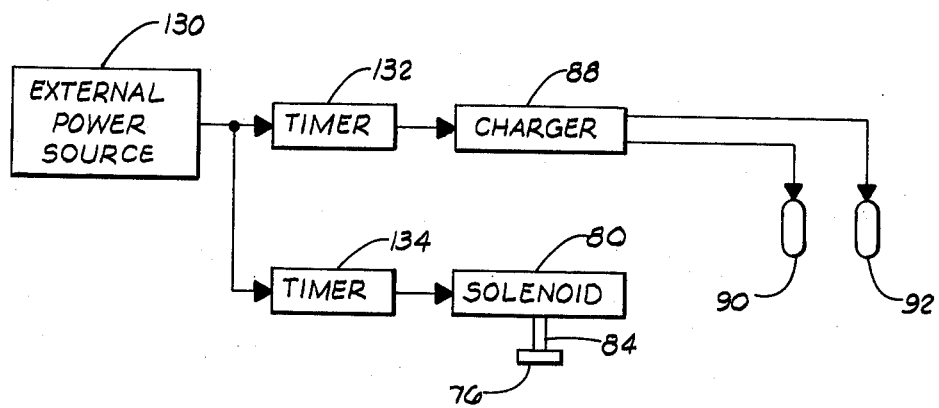
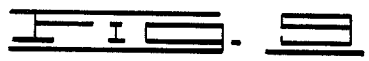

APPARATUS FOR MOTIVATING ANIMALS TO MOVE

BACKGROUND OF THE INVENTION

1. Field of the Invention

This invention relates generally to apparatus for motivating animals to move and more particularly, but not by way of limitation, to apparatus for making poultry, hogs and the like move so that they feed more often and thereby put on more weight.

2. Description of the Prior Art

In the animal raising industry it is desirable to raise each animal so that it gives a high yield of meat because this increases the efficiency of the animal raiser's operation and increases the amount to be marketed for a given number of animals. To achieve this desirable result, there is the need for an apparatus which can assist each animal to grow larger (specifically, to put on more marketable meat) and/or to reach the desired size in a relatively shorter period of time by periodically motivating the animal to move around in its containment area and consequently eat more often than if the animal were allowed to merely follow its own biological clock.

It is also desirable in the animal raising industry to reduce the mortality rate which often results when a number of animals is confined within an enclosed area in which the animals are raised. For example, poultry, which are raised in an enclosed structure, tend to bunch together in cold weather. This bunching often results in various ones of the poultry dying because they are crushed under the weight of the more outwardly bunched animals or are suffocated by the same bunching. Mortality rates are also known to increase in hot weather when the animals tend to lie down and succumb to the heat. Therefore, there is the need for an apparatus which causes the animals to move around during such periods of relatively cold or hot temperatures.

Because these desirable functions need to be performed periodically throughout each day, it is further desirable to provide means which can automatically perform them to save human time and energy. When the automatic means operates electrically off a power source which degrades with time and use, it is also necessary to provide the desired apparatus with means by which the power source can be recharged.

U.S. Pat. No. 4,167,153 in the name of Markum supports the proposition that there is the need for an apparatus which periodically causes poultry to be moved. The Markum patent discloses a guide rail having a movable carriage attached thereto, a baffle attached to the carriage and positioned adjacent the floor of the house within which the guide rail is disposed, and means for periodically moving the carriage and baffle along the guide rail. The Markum patent discloses that the period between each cycle of carriage movement is generally to be between thirty and ninety minutes and that the movement is to be effected by means of a timer-controlled electric motor and drive wheel means.

However, the Markum patent fails to disclose that the moving means described therein is applicable to animals other than poultry, and it fails to disclose means other than a baffle positioned adjacent the floor for moving poultry. This failure to teach a plurality of different motivating means is a shortcoming because animals become accustomed to a single stimulus after a period of time and thus fail to be urged to movement after they become so accustomed.

The Markum patent also does not disclose means for actuating the carriage drive means wherein the actuating means includes a docking and switch system whereby the power source for energizing the drive means can be recharged. This failure is an important shortcoming because there are various regulations regarding the nature of power sources which can be used within areas in which animals are raised. As a result of these regulations, it is desirable to use a direct current power supply, such as one or more batteries, as an energization means within the animal confinement area. If the motivating apparatus does not provide means for recharging the batteries when such a source is used, time-consuming battery changes result.

Furthermore, the Markum patent fails to disclose means for actuating the motivating apparatus when the temperature gets too cold or too hot. This failure is a critical shortcoming because during such cold or hot temperature periods, the animals may crowd together or become inactive and thereafter die from being crushed, suffocated or overexposed to heat.

SUMMARY OF THE INVENTION

The present invention overcomes the above-noted and other shortcomings of the prior art by providing a novel and improved apparatus for motivating one or more animals to move so that the animal or animals feed more often. The apparatus of the present invention causes animals to grow larger and/or reach the desired size in a shorter period of time. The present invention is responsive to both relatively cold and hot temperatures so that it operates to cause the animals to move at such times, thereby reducing animal deaths resulting from crushing or suffocation which can occur when cold temperatures exist and from heat exposure which can occur from extended periods of animal inactivity during hot temperature periods. Furthermore, the present invention performs these functions automatically throughout the day and night. This continuous, automatic operation is achieved, at least in part, by the present invention having the capability for recharging the power source which energizes the drive means of the motivating apparatus.

Broadly, the present invention provides an apparatus for motivating an animal within an enclosed area. The motivating apparatus includes a track disposed within the enclosed area. Movably mounted on the track is a carriage which is moved along the track by a drive means actuated by an actuating means. The motivating apparatus further includes animal-walking means for walking the animal when the actuating means actuates the drive means to move the carriage along the track. In one embodiment the animal-walking means is connected to the carriage by appropriate means so that the animal-walking means cannot physically touch the animal located within the enclosed area when the carriage moves along the track.

The actuating means includes a docking member which is mounted adjacent the track and which has a switch-engaging element movable from a first position to a second position. The actuating means further includes switch means connected to the carriage for co-acting with the movable switch-engaging element when the carriage is positioned adjacent the docking member.

The actuating means further includes means for setting a first temperature reference level and means for setting a second temperature reference level which is higher than the first temperature reference level to thereby establish a temperature range between the first and second temperature reference levels. Also included is a temperature sensing means and a means for energizing the drive means when the temperature sensing means senses a temperature outside the temperature range defined between the first and second temperature reference levels.

The animal-walking means may include any suitable device which is perceptible by the animal and which causes the animal, upon its perception thereof, to move within the enclosed area. Particularly, the animal-walking means may include a light, a fan, an audible signal generating means, a baffle, a scarecrow, a fringe member having a plurality of vertically extending flexible members, or a feed carrying means.

From the foregoing, it is a general object of the present invention to provide a novel and improved apparatus for motivating an animal to move. Other and further objects, features and advantages of the present invention will be readily apparent to those skilled in the art when the following description of the preferred embodiments is read in conjunction with the accompanying drawings.

BRIEF DESCRIPTION OF THE DRAWINGS

FIG. 1 is a schematic illustration showing various embodiments of the present invention disposed within an animal-containing enclosed area.

FIG. 2 is an end elevation view of the carriage, drive means and a portion of the actuating means of the present invention.

FIG. 3 is an elevation view of the carriage, drive means and a portion of the actuating means shown in FIG. 2.

FIG. 4 is a top plan view of the elements shown in FIG. 3.

FIG. 5 is an end elevation view of the docking member of the present invention.

FIG. 6 is a side elevation view of the docking member shown in FIG. 5.

FIG. 7 is a bottom plan view of the docking member shown in FIG. 5.

FIG. 8 is a schematic circuit diagram of the carriage-mounted portion of the energization scheme of a preferred embodiment of the present invention.

FIG. 9 is a block diagram of the docking member-associated portion of the energization scheme of a preferred embodiment of the present invention.

DETAILED DESCRIPTION OF PREFERRED EMBODIMENTS OF THE INVENTION

With reference to the drawings and in particular initially to the left-most part of FIG. 1, the present invention will be described. FIG. 1 shows a partial view of an animal-containing enclosed area 2, such as a poultry house, having a bottom surface 4 along which one or more animals (not shown) are to be moved by the present invention. Disposed within the enclosed area and spaced above the bottom surface thereof is a track 6. The track may be a tubular member as shown in FIG. 1 or any other suitably shaped element for supporting the requisite elements hereinafter described. The track is shown in FIG. 1 to be connected to the animal house by a plurality of support means such as a plurality of brackets 8. Movably mounted on the track 6 is a carriage 10 which is moved along the track by drive means 12 upon actuation thereof by actuating means 14. The present invention further includes animal-walking means 16 for walking the animal or animals contained within the enclosed area when the actuating means actuates the drive means to move the carriage along the track. FIG. 1 shows that the animal-walking means is connected to the carriage by suitable connecting means 18, such as a hook, so that the animal-walking means cannot physically touch the animal or animals within the enclosed area when the carriage moves along the track. For example, when the present invention is used in a poultry house, the connecting means may connect the animal-walking means to the carriage so that the bottom of the animal-walking means is from approximately two to four feet above the bottom surface 4.

The animal-walking means may include a variety of items which are perceivable by the animal within the enclosed area and which motivates, or agitates, the animal to move when the animal perceives the animal-walking means. Particularly, as shown in the alternative embodiments depicted in FIG. 1 the animal-walking means may include a light 20 and means, associated with the actuating means, for periodically illuminating the light when the carriage moves along the track. The periodically illuminating means will be more particularly discussed subsequently, with reference to FIG. 8. The animal-walking means further may include a fan 22 having a motor 24 electrically connected to the actuating means. Another embodiment of the animal-walking means includes means, electrically connected to the actuating means, for generating an audible signal, such as a buzzer 26. A further embodiment of the animal-walking means includes a baffle 28. Also, the animal-walking means may include a scarecrow 30 and/or a fringe member 32 having a plurality of vertically extending flexible members 34, such as strings of beads or strips of fabric or metal. The animal-walking means may also include a feed carrying means having a container 36 for holding the feed and having weight detecting means 37, such as a spring scale, for displaying the weight of the container and of the feed held by the container. In FIG. 1 the scale is shown connected to the carriage by a hook 38 and to the container by a set of chains 39. These different embodiments of the animal-walking means, which are shown in the various combinations of FIG. 1, may be used individually or collectively to motivate the animal contained within the enclosed area to move. This flexibility of using one or more of the different embodiments at any one time is desirable because the animal to be agitated into motion often becomes accustomed to the same stimulus after the animal has been repeatedly exposed to it.

The preferred embodiment of the carriage 10 is shown in FIGS. 2-4 to include a substantially C-shaped member 40 having its shape defined by a top portion 42, a side portion 44, and a bottom portion 46. Disposed along the top edge of the top portion are a first electrical contact 48 and second electrical contact 50 having a function as hereinafter described. The carriage 10 is movably mounted on the track 6 so that the track extends through an interior opening 52, defined by the top, side and bottom portions 42-46 of the carriage, to engage the portion of the drive means 12 mounted within this opening.

The drive means 12 is shown in FIGS. 2 and 3 to include a track-engaging means 54, such as a wheel having a groove formed around the circumference thereof. The track-engaging means 54 is rotatably mounted to the carriage as by an axle which passes through the wheel shown in FIGS. 2 and 3 and which is received by the member 40 as generally identified by reference numeral 55. The drive means further includes an electric motor 56 for rotating the track-engaging means 54 to thereby impart movement to the carriage along the track. The rotation from the motor may be imparted to the track-engaging means through a coupling means 58, such as appropriate transmission gearing. Because of certain governmental regulations regarding the types of power supplies which can be used in animal houses, it is preferred that the motor be a dc-type motor. In the preferred embodiment, the motor is energized by a six-volt, direct current power source 60 which is a six-volt rechargeable battery in the preferred embodiment.

The power source 60 is shown in FIG. 2 mounted on the carriage 10 adjacent the side and bottom portions thereof and beneath the track 6 and the drive means 12. The power source 60, which forms a part of the portion of the actuating means 14 mounted on the carriage 10, is rechargeable and has each of its terminals 62 and 64 connected to a respective one of the contacts 48 and 50 mounted along the top edge of the carriage. For simplifying the drawings, this connection is shown only in FIG. 3. The terminals of the power source 60 are switchably connected to the drive means 12 through a switch means 66 as depicted by the electrical cabling shown in FIG. 3 extending from the terminals 62 and 64 to the contacts 48 and 50 and from the contacts 48 and 50 through the switch means 66 to the motor 56. The switch means 66 forms another portion of the actuating means and is attached to the carriage in a particular manner by an appropriate means, such as a bracket 67, as subsequently described. The portion of the actuating means 14 which is associated with the carriage further includes alignment means connected to the carriage. The alignment means is particularly shown in FIG. 2 to include a pin 68 vertically extending upwardly from the top edge of the top portion 42 of the carriage 10.

In addition to including the above elements associated with the carriage 10, the actuating means includes a docking member 70 having a housing 72 connected adjacent the track 6, such as by a bracket 74, as shown in FIG. 2. The docking member 70 is more clearly depicted in FIGS. 5-7. The docking member 70 includes a movable switch-engaging element 76 which is movable from a first position (such as shown in solid line in FIG. 6) to a second position (such as shown in phantom line in FIG. 6) relative to the switch means 66 connected to the carriage 10. More particularly, the switch means 66 is connected to the carriage 10 so that the switch means coacts with the movable switch-engaging element 76 when the carriage 10 is positioned adjacent the docking member 70 as shown in FIG. 2. In the preferred embodiment shown in the drawings, the switch-engaging element 76 is a shoe.

Connecting the switch-engaging element, or shoe, 76 to the housing 72 of the docking member 70 is a means 78 for periodically spatially displacing the switch-engaging element, or shoe, 76 from its first position to its second position and for returning the element to the first position after a predetermined period of time. More particularly, the means 78 periodically displaces the movable switch-engaging element 76 from the first position to the second position so that the switch-engaging element 76 thereby coacts with the switch means 66 to connect the power source 60 to the drive means 12 whereby the carriage 10 commences moving along the track 6; and thereafter, the means 78 returns the switch-engaging element 76 to the first position after a predetermined period of time. This result is achieved when the switch means 66 is attached to the carriage by the appropriate means, such as the bracket 67, so that the switch-engaging element 76 disposed in its first position coacts with the switch means 66 to disconnect the drive means 12 from the power source 60 when the carriage 10 is positioned adjacent the docking member 70 and so that the switch-engaging element 76 disposed in its second position coacts with the switch means 66 to connect the drive means 12 to the power supply 60 when the carriage 10 is positioned adjacent the docking member.

In the preferred embodiment the periodically displacing means is a solenoid 80 having a housing 82 connected to the housing 72 of the docking member 70 and having an electromagnetically responsive arm 84 extending from the housing for attachment to the shoe which attachment is depicted in FIG. 7.

The docking member 70 further includes a recharging means for recharging the power source 60 when the carriage 10 is positioned adjacent the docking member 70. FIG. 9 represents that the recharging means includes a recharger apparatus 88 of the type for recharging a battery as is known in the art. Connected to respective outputs of the recharger apparatus 88 are a first contact arm 90 and a second contact arm 92. The contact arms 90 and 92 are pivotally connected, such as by a first pin 91 and a second pin 93, respectively, shown in FIG. 7, to the housing 72 of the docking member 70 so that their direction of pivot is along the line of movement of the carriage 10 past the docking member 70. The two contact arms 90 and 92 are disposed in spaced relation to each other, and each arm is further disposed in alignment with a respective one of the contacts 48 and 50 positioned along the top edge of the carriage. This permits each contact arm to be electrically associated with its respective contact when the carriage is positioned adjacent the docking member as shown in FIGS. 1 and 2.

FIG. 7 discloses that the docking member 70 further includes a guide means 94 for receiving the alignment means, such as the pin 68, as the carriage 10 is moved by the drive means 12 along the track 6 into docking engagement with the docking member 70 to insure that the carriage 10, which may have tilted during its traversing of the track 6 because of the manner in which it is balanced on the track as shown in FIGS. 1 and 2, is properly positioned with respect to the docking member 70. Particularly, the guide means 94 receives the alignment means so that the movable switch-engaging element 76, when it is disposed in the first position thereof, coacts with the switch means 66 to disconnect the power source 60 from the drive means 12 whereby the carriage 10 ceases moving; and the guide means 94 also receives the alignment means so that the recharging means, via the contact arms 90 and 92, rechargingly communicates with the power source 60 when the carriage 10 docks with the docking member 70. In particular, the preferred embodiment of the guide means 94 shown in FIG. 7 includes a first guide wall 96 and a second guide wall 98 disposed along the bottom of the housing 72 of the docking means 70 to define a Y-shaped configuration wherein an open end 100 of the Y first receives the alignment means and directs it into an aligning channel 102 defined between leg portions 104 and 106 of the guide walls 96 and 98, respectively, defining the stem of the Y configuration.

FIGS. 1 and 6 show that the docking member 70 also includes a counting means such as a mechanical counter 107 to count and display the number of times the carriage 10 passes by the docking member. In other words, the counter 107 shows how many times the carriage 10 has traveled around the track 6.

With reference to FIGS. 1 and 8 a further element of the actuating means will be described. This element is a temperature monitoring means 108 including means for setting a first reference temperature level, such as a first electrically conductive arm 110 pivotally mounted to a temperature scale 111, and means for setting a second temperature reference level, such as a second electrically conductive arm 112 pivotally mounted to the temperature scale 111 in spaced relation to the first arm 110, which second temperature reference level is higher than the first temperature reference level to thereby establish a temperature range between the first and second temperature reference levels. The temperature monitoring means 108 further includes a temperature sensing means 114, such as the type which converts a change in temperature to a change in mechanical movement, and means, such as a third electrically conductive arm 116 pivotally associated with the temperature sensing means and disposed along the temperature scale between the first and second arms 110 and 112, for energizing the drive means when the temperature sensing means 114 senses a temperature outside the temperature range defined between the first and second temperature reference levels. In other words, the energizing means, such as the third arm 116, connects the power supply 60 to the drive means 12 when the temperature sensed by the temperature sensing means 114 is less than or equal to the first temperature reference level or is greater than or equal to the second temperature reference level. This connection occurs whenever the third arm 116 contacts either the first arm 110 or the second arm 112 because, as shown in FIG. 8, each of the temperature reference level setting means, or arms 110 and 112, is connected to one terminal of the power source 60 and the arm 116 of the energizing means is connected to that one of the leads of each of the elements shown within the circuit which is not connected to the other terminal of the power source 60. Although the first temperature reference level and the second temperature reference level can be set anywhere within the temperature range of the scale 111 associated with the temperature sensing means 114, I have found that, for poultry, the first temperature reference level should be set within the range from approximately 30° F. to 60° F. and the second temperature reference level should be set within the range from approximately 90° F. to 110° F.

The actuating means 14 may also include a switch 117 remotely associated with the carriage 10 for switchably connecting the battery 60 to the motor 56. This remote switch is particularly used with the feed container means so that the person disbursing the feed from the container 36 can actuate the dirve means 12 at his or her own pace. With reference to the circuit schematically shown in FIG. 8, this remote switch means would be connected in parallel with the switch means 66 and the temperature monitoring means 108.

Referring again to FIG. 8, the remainder of the circuit disclosed therein will be described. Schematically represented therein are the contacts 48 and 50 which are disposed along the top edge of the carriage 10. Each of these is connected to a respective terminal of the power source 60. In the preferred embodiment shown in FIG. 8, the negative terminal of the power source 60 is shown connected to each of the elements to be energized by the power source. The positive terminal of the power source 60 is connected to the switch means 66 and to the first and second arms 110 and 112 of the temperature reference level setting means of the temperature monitoring device 108. Connected to the other terminal of the switch means 66 and to the third arm 116 of the temperature monitoring means 108 are the other leads of the various elements. These elements include the motor 56 of the drive means 12, the fan motor 24 when it is used in a particular configuration of the animal-walking means, and to the means for periodically illuminating the light (and for periodically sounding the audible signal generating means 26 when it is used) which is generally identified by the reference numeral 118. The periodically illuminating means includes an oscillating circuit means 120 and an electronic switch means 122 responsive to the oscillating circuit means.

The oscillating circuit means 120 includes the resistor-capacitor-transistor network shown in FIG. 8, and the electronic switch means 122 includes the base resistor and transistor shown in FIG. 8. Connected to the collector of the electronic switch means transistor is the buzzer, or audible signal generating means, 26. The light 20 is connected to the collector through a current-limiting resistor 124 having a suitable resistance as known in the art. The oscillating circuit means 120 and the electronic switch means 122 function together to cause the light 20 and the buzzer 26 to be intermittently activated whenever power is supplied thereto through the switch means 66 or the temperature monitoring means 108. It is to be noted that the component values shown in FIG. 8 are indicative of a preferred embodiment and do not limit the range of usable values for such components.

When either the switch means 66 is closed or the temperature sensing means 114 senses a temperature outside the range defined by the first and second temperature reference level setting means, the motor 56 of the drive means 12 is actuated, the fan motor 24 is actuated, and the oscillator circuit means 120 is actuated so that the electronic switch means 122 responsive thereto is periodically turned on and off to likewise periodically turn on and off the light and the audible signal generating means connected thereto. FIG. 8 shows that the fan motor 26 and the periodically illuminating means 118 may be manually deactivated by means of a first cut-off switch means 126 and a second cut-off switch means 128, respectively.

Although not illustrated in FIG. 8, the circuit shown therein may include switch means for reversibly connecting the power source to the drive means motor 56 whereby the motor may be driven in either a forward or a reverse direction.

FIG. 9 discloses a functional block diagram of the elements for recharging the power source 60 located on the carriage 10 and for periodically activating the solenoid 80 to periodically displace the switch-engaging element 76 connected thereto. As shown in FIG. 9, an external power source 130, such as a 110-VAC power supply, drives a first timer means 132 for activating the recharger apparatus of the recharging means 88 for a predetermined period of time. The output of the recharger apparatus is connected to respective ones of the contact arms 90 and 92. The external power source 130 also activates a second timer means 134 which controls the operation of the solenoid 80; therefore, the second timer means 134 controls how often the carriage 10 is permitted to travel around the track 6 as will become more apparent with respect to the description of the operation of the present invention.

The operation of the present invention has two independent modes. The first mode is controlled by the second timer means 134 which is set to permit a predetermined period of time to elapse between consecutive actuations by the timer means 134 of the solenoid 80. The second mode is controlled by the temperature monitoring means 108.

With respect to the timer-controlled mode, it will be assumed that the starting position is with the carriage 10 positioned adjacent the docking member 70 as shown in FIGS. 1 and 2. In this position the switch-engaging element, or shoe 76 in the preferred embodiment, is in its first position and thus engages the switch means 66 to disconnect the battery 60 from the motor 56 of the drive means 12 so that the carriage 10 is not moving along the track 6. For the circuit shown in FIG. 8 this disconnection occurs when the switch means 66 is open. Upon the expiration of the predetermined time period set in the second timer means 134, which predetermined time period can be variably set, the solenoid 80 is activated so that the electromagnetically responsive arm 84 is drawn upward to thereby move the shoe 76 to its second position. In this position, the shoe 76 and the switch means 66 coact to connect the battery to the motor 56 of the drive means 12 which causes the carriage 10 to move along the track 6. For the FIG. 8 circuit embodiment, this coaction closes the switch means 66.

As the carriage 10 moves along the track 6, the animal-walking means 16 agitates the animal to move so that it feeds. For example, if the light 20 is used as the animal-walking means, the oscillating circuit means 120 of the periodically illuminating means 118 causes the light 20 to flash whereby it is perceived by the animal and causes it to move. This perception and causal effect can be achieved with the light 20 by, for example, aiming the light 20 to reflect off the ceiling of the enclosed area 2 so that the animal or animals therein instinctively react to the reflected light and move. During such movement the agitated animal or animals eats food which is placed, for example, on the bottom surface 4.

As the carriage 10 completes its travel around the track 6 and returns to the docking member 70, the alignment means such as the pin 68 enters the open end 100 of the Y-configured guide means 94 and is directed to the alignment channel 102 so that the switch means 66 encounters the shoe 76 and disconnects the battery 60 from the motor 56 when the shoe 76 sufficiently engages the switch means 66. The switch means 66 is able to engage the shoe 76 at the end of the travel of the carriage 10 because the second timer means 134 has previously deactivated the solenoid 80 after a predetermined amount of time which is shorter than the duration of the carriage travel time around the track 6. The travel time depends on the length of the track and the speed of the motor. In the preferred embodiment the speed of the motor 56 is approximately 100 feet/min.

This alignment action between the pin 68 and the guide means 94 also aligns the contact arms 90 and 92 with respect contacts 48 and 50 so that the battery 60 can be recharged after the carriage 10 ceases its movement. Once the carriage 10 comes to rest, the recharger means recharges the battery 60 for the predetermined period of time as established by the first timer means 132.

The carriage 10 remains in a stationary position until the second timer means 134 completes its timing period and again activates the solenoid 80. When the preferred embodiment of the present invention is used to motivate poultry, the period between consecutive trips of the carriage 10 around the track is preferably set in the second timer means 134 at approximately four hours. This period is used when poultry are being motivated because the digestive period of poultry is approximately three hours, so by setting a period of four hours the poultry is allowed to eat and digest its food.

With respect to the second mode of operation based on the control provided by the temperature monitoring means 108, the carriage 10 is caused to move whenever the temperature sensing means 114 senses a temperature outside the range established between the first and second temperature reference levels. This occurs because, as shown in FIG. 8, the temperature monitoring means 108 functions as a switch connected in parallel with the switch means 66. This switch function of the temperature monitoring means 108 is apparent in FIG. 8 because when the temperature sensing means 114 senses a temperature outside the set range, it moves the electrically conducting arm 116 connected thereto into contact with the electrically conductive arm 110 or 112 which set the reference level that has been exceeded and thereby closes the circuit between the battery 60 and the various circuit elements shown in FIG. 8. Therefore, when either the switch means 66 or the temperature monitoring means 108 closes the connection between the battery 60 and the motor 56, the carriage moves.

Thus, the present invention of an apparatus for motivating animals to move is well adapted to carry out the objects and attain the ends and advantages mentioned above as well as those inherent therein. While preferred embodiments of the invention have been described for the purpose of this disclosure, numerous changes in the construction and arrangement of parts can be made by those skilled in the art, which changes are encompassed within the spirit of this invention as defined by the appended claims.

What is claimed is:

1. An apparatus for motivating an animal to move along a bottom surface within an enclosed area, comprising:
   a track disposed within the enclosed area and spaced above the bottom surface thereof;
   a carriage movably mounted on said track;
   drive means for moving said carriage along said track;
   actuating means for actuating said drive means, said actuating means including:
   means for setting a first temperature reference level;
   means for setting a second temperature reference level which is higher than the first temperature reference level;
   temperature sensing means; and
   means for energizing said drive means when the temperature sensed by said temperature sensing means is less than or equal to the first temperature reference level or is greater than or equal to the second temperature reference level;

animal-walking means for causing the animal to move along the bottom surface when said actuating means actuates said drive means to move said carriage along said track; and connecting means for connecting said animal-walking means to said carriage so that said animal-walking means cannot physically touch the animal when said carriage moves along said track.

2. An apparatus for motivating an animal to move along a bottom surface within an enclosed area, comprising:

a track disposed within the enclosed area and spaced above the bottom surface thereof;

a carriage movably mounted on said track;

drive means for moving said carriage along said track;

actuating means for actuating said drive means, said actuating means including:

a docking member connected to said track, said docking member including:

a shoe disposed in a first position in said docking member; and means for periodically spatially displacing said shoe from the first position to a second position and for returning said shoe to the first position after a predetermined period of time;

switch means for switchably connecting said drive means to a power source; and means for attaching said switch means to said carriage so that said shoe disposed in the first position coacts with said switch means to disconnect said drive means from the power source when said carriage is positioned adjacent said docking member and so that said shoe disposed in the second position coacts with said switch means to connect said drive means to the power source when said carriage is positioned adjacent said docking member;

animal-walking means for causing the animal to move along the bottom surface when said actuating means actuates said drive means to move said carriage along said track; and connecting means for connecting said animal-walking means to said carriage so that said animal-walking means cannot physically touch the animal when said carriage moves along said track.

3. An apparatus for motivating an animal to move within an enclosed area, comprising:

a track disposed within the enclosed area;

a carriage movably mounted on said track;

drive means for moving said carriage along said track;

actuating means for actuating said drive means, said actuating means including:

a docking member mounted on said track, said docking member having a movable switch-engaging element movable from a first position to a second position;

switch means connected to said carriage for coacting with said movable switch-engaging element when said carriage is positioned adjacent said docking member; and animal-walking means, connected to said carriage, for causing the animal to move when said actuating means actuates said drive means to move said carriage along said track.

4. An apparatus as recited in claim 3, wherein said animal-walking means includes:

a light; and means, associated with said actuating means, for periodically illuminating said light when said carriage moves along said track.

5. An apparatus as recited in claim 3, wherein said animal-walking means includes means, electrically connected to said actuating means, for generating an audible signal.

6. An apparatus as recited in claim 3, wherein said animal-walking means includes a fan having a motor electrically connected to said actuating means.

7. An apparatus as recited in claim 3, wherein said animal-walking means includes a baffle.

8. An apparatus as recited in claim 3, wherein said animal-walking means includes a scarecrow.

9. An apparatus as recited in claim 3, wherein said animal-walking means includes a plurality of vertically extending flexible members.

10. An apparatus as recited in claim 3, wherein said animal-walking means includes:

a container for holding feed; and means, connected at a first end to said carriage and at a second end to said container, for detecting the weight of said container and the feed stored in said container.

11. An apparatus as recited in claim 3, wherein said actuating means further includes:

means for setting a first temperature reference level;

means for setting a second temperature reference level which is higher than the first temperature reference level to thereby establish a temperature range between the first and second temperature reference levels;

temperature sensing means; and means for energizing said drive means when said temperature sensing means senses a temperature outside the temperature range defined by the first and second temperature reference levels.

12. An apparatus as recited in claim 3, wherein:

said actuating means further includes:

a rechargeable power source disposed on said carriage and switchably connected to said drive means through said switch means; and said docking member further includes:

recharging means for recharging said power source when said carriage is positioned adjacent said docking member.

13. An apparatus as recited in claim 12, wherein:

said actuating means further includes alignment means connected to said carriage; and said docking member further includes guide means for receiving said alignment means as said carriage is moved along said track into docking engagement with said docking member so that said movable switch-engaging element, disposed in the first position thereof, coacts with said switch means to disconnect said power source from said drive means whereby said carriage ceases moving and so that said recharging means rechargingly communicates with said power source.

14. An apparatus as recited in claim 13, wherein said docking member further includes means for periodically displacing said movable switch-engaging element from the first position to the second position so that said switch-engaging element thereby coacts with said switch means to connect said power source to said drive means whereby said carriage commences moving along said track and for returning said switch-engaging element to the first position after a predetermined period of time.

15. An apparatus for motivating an animal to move within an enclosed area, comprising:
a track disposed within the enclosed area;
a carriage movably mounted on said track;
drive means for moving said carriage along said track;
actuating means for actuating said drive means, said actuating means including;
   means for setting a first temperature reference level;
   means for setting a second temperature reference level which is higher than the first temperature reference level to thereby establish a temperature range between the first and second temperature reference levels;
   temperature sensing means; and
   means for energizing said drive means when said temperature sensing means senses a temperature outside the temperature range defined by the first and second temperature reference levels; and
animal-walking means, connected to said carriage, for causing the animal to move when said actuating means actuates said drive means to move said carriage along said track.

16. An apparatus as recited in claim 15, wherein said animal-walking means includes:
a light; and
means, associated with said actuating means, for periodically illuminating said light when said carriage moves along said track.

17. An apparatus as recited in claim 15, wherein said animal-walking means includes means, electrically connected to said actuating means, for generating an audible signal.

18. An apparatus as recited in claim 15, wherein said animal-walking means includes a fan having a motor electrically connected to said actuating means.

19. An apparatus as recited in claim 15, wherein said animal-walking means includes a baffle.

20. An apparatus as recited in claim 15, wherein said animal-walking means includes a scarecrow.

21. An apparatus as recited in claim 15, wherein said animal-walking means includes a plurality of vertically extending flexible members.

22. An apparatus as recited in claim 15, wherein said animal-walking means includes:
a container for holding feed; and
means, connected at a first end to said carriage and at a second end to said container, for detecting the weight of said container and the feed stored in said container.

* * * * *